(12) United States Patent
Gao et al.

(10) Patent No.: US 12,665,806 B2
(45) Date of Patent: Jun. 23, 2026

(54) BURST DETECTION FOR ROOT CAUSE ANALYSIS OF COMMUNICATION NETWORK SOFT FAILURES

(71) Applicant: AT&T Intellectual Property I, L.P., Atlanta, GA (US)

(72) Inventors: Chunhua Gao, Freehold, NJ (US); Kevin D'Souza, Yardley, PA (US); Leah Zhang, Holmdel, NJ (US); Christopher Gwaltney, St. Charles, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 8 days.

(21) Appl. No.: 18/815,376

(22) Filed: Aug. 26, 2024

(65) Prior Publication Data

US 2026/0058862 A1     Feb. 26, 2026

(51) Int. Cl.
H04L 41/0631 (2022.01)

(52) U.S. Cl.
CPC ................................. H04L 41/064 (2013.01)

(58) Field of Classification Search
CPC ....... H04L 41/064; H04L 41/12; H04L 43/04; H04L 43/08; H04L 43/0805; H04L 43/0811; H04L 43/0817; H04L 43/0829; H04L 43/0852; H04L 43/10; H04L 43/16; H04L 43/50; H04L 45/02; H04L 45/22; H04L 45/28; H04L 47/125
See application file for complete search history.

(56) References Cited

U.S. PATENT DOCUMENTS

| | | | | |
|---|---|---|---|---|
| 9,712,381 | B1 * | 7/2017 | Emanuel ............. | H04L 41/0645 |
| 2005/0188240 | A1 * | 8/2005 | Murphy .............. | G06F 11/0709 |
| | | | | 714/4.4 |
| 2009/0213725 | A1 * | 8/2009 | Kibel ..................... | H04L 12/66 |
| | | | | 370/216 |

(Continued)

FOREIGN PATENT DOCUMENTS

| | | | | |
|---|---|---|---|---|
| EP | 1239611 A2 * | 9/2002 | ........... | H04B 10/035 |

OTHER PUBLICATIONS

W. W. T. Fok et al., "MonoScope: Automating network faults diagnosis based on active measurements," 2013 IFIP/IEEE International Symposium on Integrated Network Management (IM 2013), Ghent, Belgium, 2013, pp. 210-217. (Year: 2013).*

*Primary Examiner* — Christopher Biagini

(57) ABSTRACT
A processing system may obtain network connectivity test results, each indicating success or failure of a network connectivity test between a respective router pair from a plurality of routers of the communication network. The processing system may identify, from the connectivity test results, a burst of network connectivity results indicating network connectivity test failures, and identify, from the connectivity results, a subset of connectivity test results indicating failures from within a time period associated with the burst. The processing system may further determine, for each connectivity test result in the subset, connectivity path information including one or more routers between a router pair of the connectivity test result. The processing system may then determine, from the connectivity path information of the subset, a router with a highest number of occurrences, and may identify the router as a cause of a soft failure in the communication network.

20 Claims, 4 Drawing Sheets

(56) References Cited

U.S. PATENT DOCUMENTS

| | | | |
|---|---|---|---|
| 2020/0021511 A1* | 1/2020 | Xu ........................ | H04L 41/069 |
| 2020/0314127 A1* | 10/2020 | Wilson .................... | H04L 43/16 |
| 2022/0045931 A1* | 2/2022 | Berman .................. | H04L 69/40 |

* cited by examiner

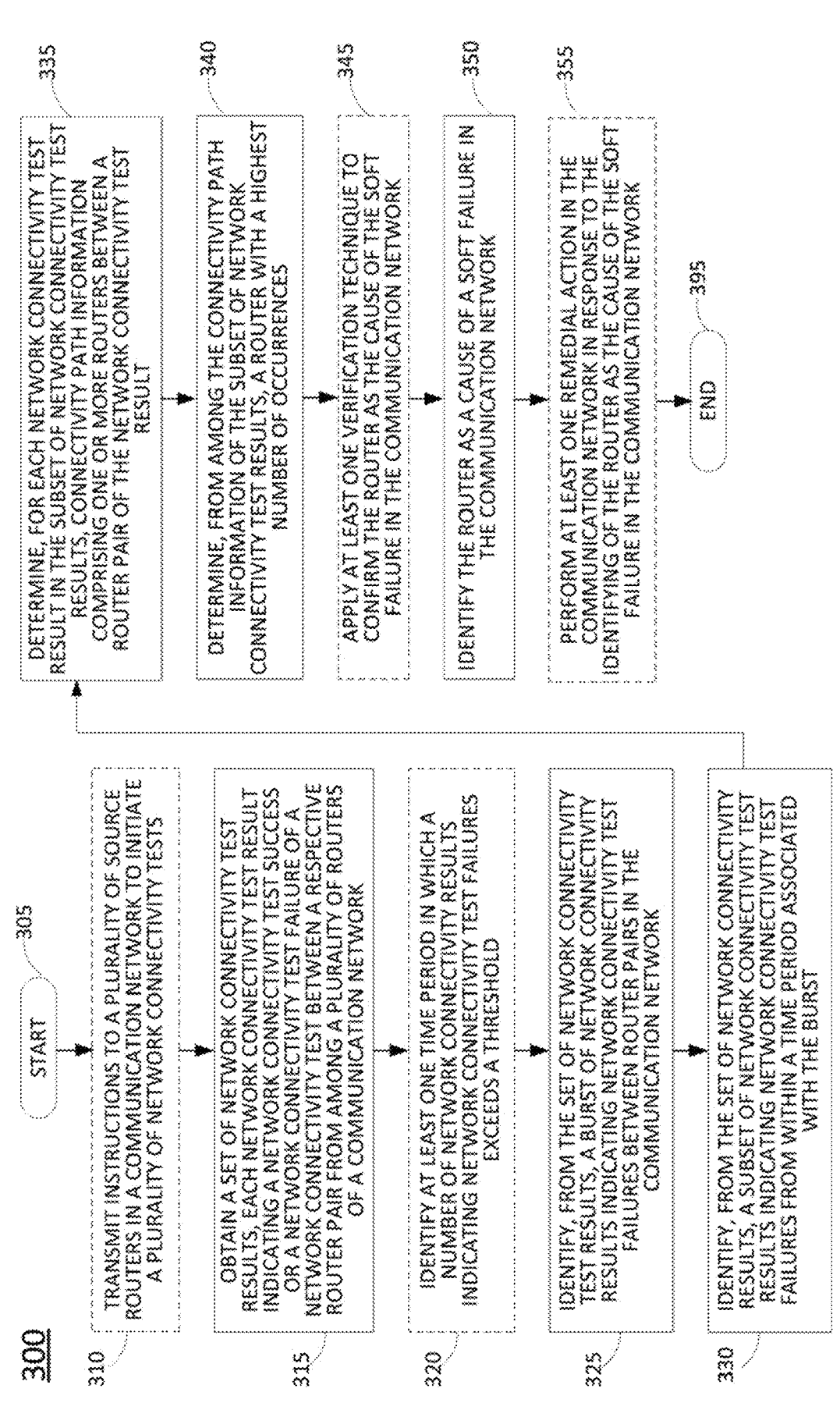

300

START 305

310 TRANSMIT INSTRUCTIONS TO A PLURALITY OF SOURCE ROUTERS IN A COMMUNICATION NETWORK TO INITIATE A PLURALITY OF NETWORK CONNECTIVITY TESTS

315 OBTAIN A SET OF NETWORK CONNECTIVITY TEST RESULTS, EACH NETWORK CONNECTIVITY TEST RESULT INDICATING A NETWORK CONNECTIVITY TEST SUCCESS OR A NETWORK CONNECTIVITY TEST FAILURE OF A NETWORK CONNECTIVITY TEST BETWEEN A RESPECTIVE ROUTER PAIR FROM AMONG A PLURALITY OF ROUTERS OF A COMMUNICATION NETWORK

320 IDENTIFY AT LEAST ONE TIME PERIOD IN WHICH A NUMBER OF NETWORK CONNECTIVITY RESULTS INDICATING NETWORK CONNECTIVITY TEST FAILURES EXCEEDS A THRESHOLD

325 IDENTIFY, FROM THE SET OF NETWORK CONNECTIVITY TEST RESULTS, A BURST OF NETWORK CONNECTIVITY RESULTS INDICATING NETWORK CONNECTIVITY TEST FAILURES BETWEEN ROUTER PAIRS IN THE COMMUNICATION NETWORK

330 IDENTIFY, FROM THE SET OF NETWORK CONNECTIVITY RESULTS, A SUBSET OF NETWORK CONNECTIVITY TEST FAILURES INDICATING NETWORK CONNECTIVITY TEST FAILURES FROM WITHIN A TIME PERIOD ASSOCIATED WITH THE BURST

335 DETERMINE, FOR EACH NETWORK CONNECTIVITY TEST RESULT IN THE SUBSET OF NETWORK CONNECTIVITY TEST RESULTS, CONNECTIVITY PATH INFORMATION COMPRISING ONE OR MORE ROUTERS BETWEEN A ROUTER PAIR OF THE NETWORK CONNECTIVITY TEST RESULT

340 DETERMINE, FROM AMONG THE CONNECTIVITY PATH INFORMATION OF THE SUBSET OF NETWORK CONNECTIVITY TEST RESULTS, A ROUTER WITH A HIGHEST NUMBER OF OCCURRENCES

345 APPLY AT LEAST ONE VERIFICATION TECHNIQUE TO CONFIRM THE ROUTER AS THE CAUSE OF THE SOFT FAILURE IN THE COMMUNICATION NETWORK

350 IDENTIFY THE ROUTER AS A CAUSE OF A SOFT FAILURE IN THE COMMUNICATION NETWORK

355 PERFORM AT LEAST ONE REMEDIAL ACTION IN THE COMMUNICATION NETWORK IN RESPONSE TO THE IDENTIFYING OF THE ROUTER AS THE CAUSE OF THE SOFT FAILURE IN THE COMMUNICATION NETWORK

END 395

BURST DETECTION FOR ROOT CAUSE ANALYSIS OF COMMUNICATION NETWORK SOFT FAILURES

The present disclosure relates generally to communication network operations, and more particularly to methods, computer-readable media, and apparatuses for identifying a router as a cause of a soft failure based upon a burst of network connectivity results indicating network connectivity test failures between edge router pairs in a communication network.

BACKGROUND

Upgrading a communication network to a software defined network (SDN) architecture implies replacing or augmenting existing network elements that may be integrated to perform a single function with new network elements. The replacement technology may comprise a substrate of networking capability, often called network function virtualization infrastructure (NFVI) that is capable of being directed with software and SDN protocols to perform a broad variety of network functions and services. Different locations in the communication network may be provisioned with appropriate amounts of network substrate, and to the extent possible, routers, switches, edge caches, middle-boxes, and the like, may be instantiated from the common resource pool.

SUMMARY

In one example, the present disclosure discloses a method, computer-readable medium, and apparatus for identifying a router as a cause of a soft failure based upon a burst of network connectivity results indicating network connectivity test failures between edge router pairs in a communication network. For example, a processing system including at least one processor deployed in a communication network may obtain a set of network connectivity test results, each network connectivity test result indicating a network connectivity test success or a network connectivity test failure of a network connectivity test between a respective router pair from a plurality of routers of the communication network. The processing system may next identify, from the set of network connectivity test results, a burst of network connectivity results indicating network connectivity test failures between router pairs in the communication network, and identify, from the set of network connectivity results, a subset of network connectivity test results indicating network connectivity test failures from within a time period associated with the burst. The processing system may further determine, for each network connectivity test result in the subset of network connectivity test results, connectivity path information comprising one or more routers between a router pair of the network connectivity test result. The processing system may then determine, from the connectivity path information of the subset of network connectivity test results, a router with a highest number of occurrences, and may identify the router as a cause of a soft failure in the communication network.

BRIEF DESCRIPTION OF THE DRAWINGS

The teaching of the present disclosure can be readily understood by considering the following detailed description in conjunction with the accompanying drawings, in which:

FIG. 3 illustrates a flowchart of an example method for identifying a router as a cause of a soft failure based upon a burst of network connectivity results indicating network connectivity test failures between edge router pairs in a communication network.

To facilitate understanding, identical reference numerals have been used, where possible, to designate identical elements that are common to the figures.

DETAILED DESCRIPTION

Figure 1:
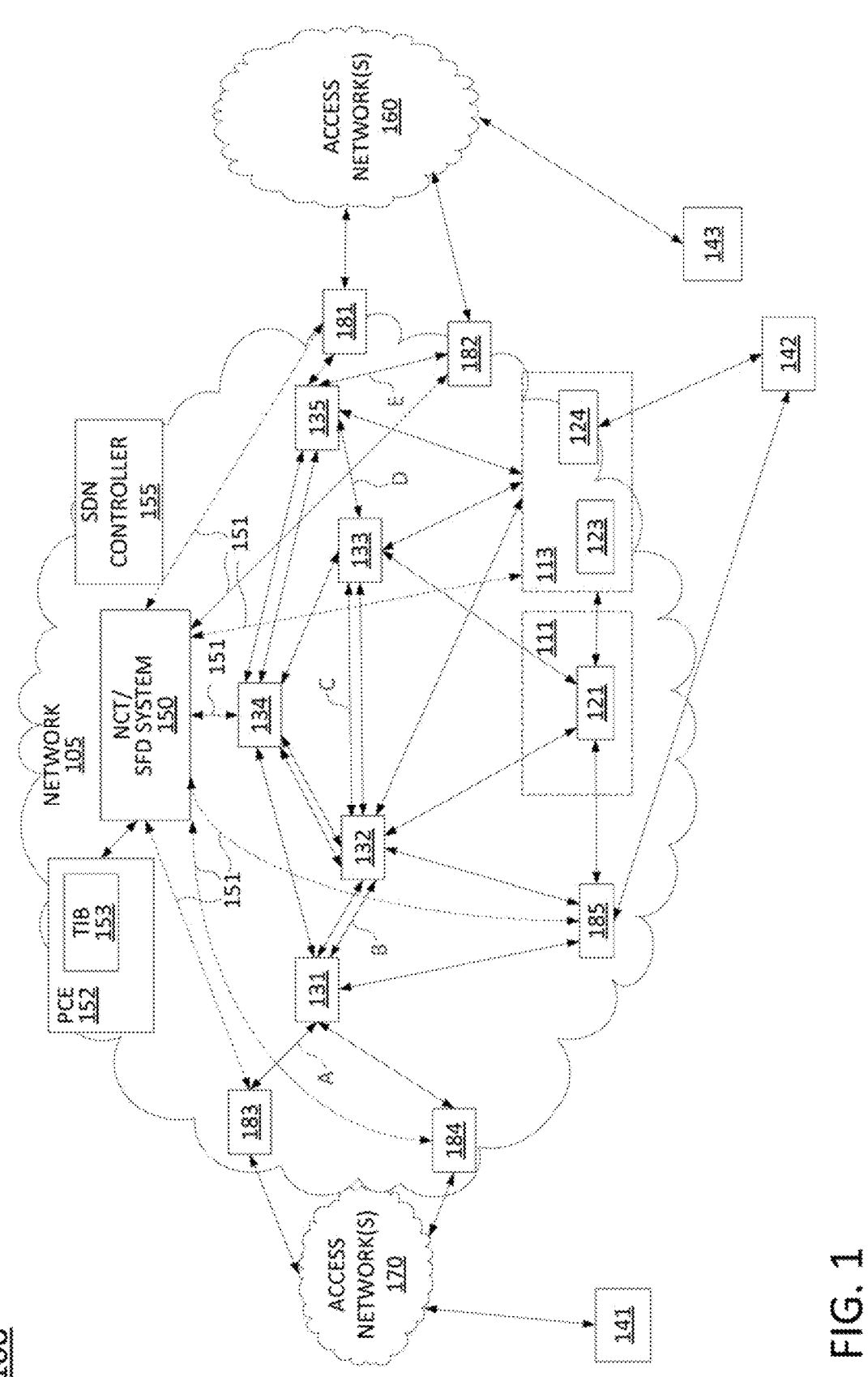
FIG. 1 illustrates an example system related to the present disclosure.

The present disclosure broadly discloses methods, computer-readable media, and apparatuses for identifying a router as a cause of a soft failure based upon a burst of network connectivity results indicating network connectivity test failures between edge router pairs in a communication network. For instance, examples of the present disclosure provide an artificial intelligence (AI)/machine learning (ML)-based clustering and burst detection methodology for identification of root causes for communication network blackhole failure events (e.g., soft failures). Examples of the present disclosure may provide near-real time and historical monitoring and event analysis, as well as graphic display for root cause identification results.

When blackhole network failure events (e.g., silent failures, or silent failure events) occur, there may be thousands/millions of events occurring at or around the same time, e.g., a burst of events. By their nature, silent failures are not accompanied by detection and notification of physical device failures. Rather, network traffic is simply dropped somewhere on a path from a source to a destination in the network. Accordingly, silent failures may be challenging for a network operator to address via conventional root cause analysis techniques. For instance, existing software may perform topology correlation to attempt to identify the root cause. However, given the substantial volume of data involved, achieving a result in a timely manner (or at all) may be challenging with typical computing resources allocated to such tasks.

In contrast, examples of the present disclosure may apply AI/ML burst detection and cluster modeling as described herein to automatically and efficiently identify root cause routers for blackhole/soft failures. For instance, examples of the present disclosure may collect and process network connectivity test results indicating success or failure of network connectivity tests between router pairs across a communication network (e.g., edge router pairs). For example, each network connectivity test result may indicate the source and destination routers, a time of the network connectivity test (e.g., a timestamp or timestamps indicating time(s) when one or more test packets are sent), and a result (e.g., success or failure). In one example, the network connectivity test results may also include a path identifier (ID), or tunnel ID. In one example, the network connectivity tests may be round trip. In another example, the network connectivity tests may be one-way from source router to destination router. In one example, the network connectivity tests may include one or more packets that are transmitted and processed via label switched paths (LSPs), e.g., using Multi-Protocol Label Switching (MPLS) or the like. As such, the network connectivity tests may traverse over known paths, which may be identified by path or tunnel ID, and which may have known routers or number of hops along such paths. For instance, a communication network may maintain information on known paths or tunnels in a topology information block (TIB) or the like, e.g., a database with records for various paths that may be selected to comprise various tunnels, e.g., Traffic Engineering (TE) tunnels comprising label switched paths (LSPs) through the communication network.

In one example, the present disclosure may identify a soft failure time period, e.g., a sliding time window, in which a number of network connectivity results indicating network connectivity test failures exceeds a threshold. In one example, in response to the identification of such a soft error time period, the present disclosure may then identify a burst of network connectivity results indicating network connectivity test failures between router pairs in the communication network. In this regard, it should be noted that the burst may comprise a shorter time span within the soft error time period. In one example, the burst may be identified by applying a burst detection algorithm. For instance, the burst detection algorithm may comprise a Kleinberg burst detection algorithm, or the like. In one example, various parameters of the Kleinberg burst detection algorithm may be selected and/or tuned, such as gamma or s-factor, as described in greater detail below. In one example, the present disclosure may then select a subset of network connectivity test results indicating "failure" and which have timestamps within a time window associated with the burst. For instance, the time window may be commensurate with the burst. In another example, such a time window may have a start time having a fixed time before an identified start of the burst and/or an end time having a fixed time after an identified end of the burst, e.g., one minute before the start of the burst to one minute after the end of the burst, five minutes before the start of the burst to five minutes after the end of the burst, etc. In still another example, such a time window may be based upon (1) the start and/or end time of the burst and (2) a duration of the burst, e.g., a time window centered on the burst and having a duration 5% percent longer than the burst, 10% longer than the burst, etc.

In one example, the present disclosure may determine, for each network connectivity test result in the subset of network connectivity test results, connectivity path information, e.g., one or more routers between a source and destination router pair of the associated network connectivity test. For instance, the path information may be obtained via a topology information block (TIB) or the like. From this information, the present disclosure may then determine a router with a highest number of occurrences in the path information for the subset of network connectivity test results. In addition, the router may be identified as a cause (e.g., a root cause) of a soft failure/blackhole in the communication network. Thus, examples of the present disclosure accurately and efficiently identify network-impacting silent failures and the root cause router(s) thereof.

In one example, the present disclosure may identify geographic location and may further identify and report a severity of the silent failure, e.g., based upon a number and/or a volume of customer traffic impacts. In one example, a soft failure detection system of the present disclosure may be used for historical analysis, e.g., to identify failure patterns and root cause trends over extended time periods, such as over hours, days, weeks, months, etc. It should also be noted that examples of the present disclosure may also reduce a number of false positives and false negatives, e.g., that may be identified via other techniques. For example, a soft failure detection system of the present disclosure may isolate root cause routers when there are several non-overlapping silent failure events, and/or may isolate soft failures root causes from other non-blackhole events that may be concurrent. In addition, in one example, the present disclosure may quantify impacts of soft failures on edge-to-edge traffic, e.g., by severity score, by geographic-mapping impact, etc.

As such, the present disclosure may provide a tunable and configurable soft failure detection system that may further adapt via self-learning to iteratively improve the accuracy and speed of root cause identification. In one example, the present soft failure detection system may be scalable to accommodate an evolving communication network or communication network zones. In addition, in one example, the present soft failure detection system may integrate with cross-domain data (e.g., fault, PM) to build a more comprehensive operations support tool. For instance, root cause-identified routers may be verified via other tools/systems, which may further accelerate the resolution of network issues impacting customer traffic. In addition, examples of the present disclosure may include and/or may be integrated with a comprehensive set of reporting/visualization tools. Accordingly, examples of the present disclosure reduce root cause identification time, improve accuracy and efficiency, and reduce the allocated resources (e.g., compute or human) that may be used to troubleshoot and identify root causes, ultimately increasing communication network quality and reliability. These and other aspects of the present disclosure are discussed in greater detail below in connection with the examples of FIGS. 1-4.

To aid in understanding the present disclosure, FIG. 1 illustrates a block diagram depicting one example of a network, or system 100 suitable for performing or enabling the steps, functions, operations, and/or features described herein. The overall communications system 100 may include any number of interconnected networks which may use the same or different communication technologies. As illustrated in FIG. 1, system 100 may include a network 105, e.g., a core communication network. In one example, the network 105 may comprise a backbone network, or transport network, such as an Internet Protocol (IP)/Multi-Protocol Label Switching (MPLS) network, where label switched paths (LSPs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. In this regard, it should be noted that as referred to herein, "traffic" may comprise all or a portion of a transmission, e.g., a sequence or flow, comprising one or more packets, segments, datagrams, frames, cells, PDUs, service data unit, bursts, and so forth. The particular terminology or types of data units involved may vary depending upon the underlying network technology. Thus, the term "traffic" is intended to refer to any quantity of data to be sent from a source to a destination through one or more networks.

The network 105 may alternatively or additional comprise components of a cellular core network, such as a Public Land Mobile Network (PLMN), a General Packet Radio Service (GPRS) core network, and/or an evolved packet core (EPC) network, an Internet Protocol Multimedia Subsystem (IMS) network, a Voice over Internet Protocol (VoIP) network, and so forth which may utilize label switching. In one example, the network 105 uses network function virtualization infrastructure (NFVI), e.g., servers in a data center or data centers that are available as host devices to host virtual machines (VMs) comprising virtual network functions (VNFs). In other words, at least a portion of the core communication network 105 may incorporate software-defined network (SDN) components.

In one embodiment, the network 105 may be in communication with access networks 160 and access networks 170. Access networks 160 and 170 may comprise wireless networks (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, and the like. In one example, the access networks 160 and 170 may include different types of networks. In another example, the access networks 160 and 170 may be the same type of network. The access networks 160 and 170 may be controlled or operated by a same entity as that of network 105 or may be controlled or operated by one or more different entities. In one example, the access networks 160 and 170 may comprise separate domains, e.g., separate routing domains as compared to the network 105. In one example, access networks 160 and/or access networks 170 may represent the Internet in general.

In one example, network 105 may transport traffic to and from user devices 141-143. For instance, the traffic may relate to communications such as voice telephone calls, video and other multimedia, text messaging, email, and so forth among the user devices 141-143, or between the user devices 141-143 and other devices that may be accessible via access networks 160 and 170. User devices 141-143 may comprise, for example, cellular telephones, personal computers, other wireless and wired computing devices, private branch exchanges, customer edge (CE) routers, media terminal adapters, cable boxes, home gateways and/or routers, and so forth. In accordance with the present disclosure, user devices 141-143 may access network 105 in various ways. For example, user device 141 may comprise a cellular telephone which may connect to network 105 via access network 170, e.g., a cellular access network. For instance, in such an example access network 170 may include one or more cell sites, e.g., comprising, a base transceiver station (BTS), a NodeB, an evolved NodeB (eNodeB), or the like (broadly a "base station"), a remote radio head (RRH) and baseband unit, a base station controller (BSC) or radio network controller (RNC), and so forth. In addition, in such an example, components 183 and 184 in network 105 may comprise a serving gateway (SGW), a mobility management entity (MME), or the like. In one example, user device 142 may comprise a customer edge (CE) router which may provide access to network 105 for additional user devices (not shown) which may be connected to the CE router. For instance, in such an example, component 185 may comprise a provider edge (PE) router.

As mentioned above, various components of network 105 may comprise virtual network functions (VNFs) which may physically comprise hardware executing computer-readable/computer-executable instructions, code, and/or programs to perform various functions. As illustrated in FIG. 1, units 123 and 124 may reside on network function virtualization infrastructure (NFVI) 113, which is configurable to perform a broad variety of network functions and services. For example, NFVI 113 may comprise shared hardware, e.g., one or more host devices comprising line cards, central processing units (CPUs), or processors, memories to hold computer-readable/computer-executable instructions, code, and/or programs, and so forth. For instance, in one example unit 123 may be configured to be a firewall, a media server, etc., and unit 124 may be configured to be a PE router, e.g., a virtual provide edge (VPE) router, which may provide connectivity to network 105 for user device 142 and others. In one example, NFVI 113 may represent a single computing device. Accordingly, units 123 and 124 may physically reside on the same host device. In another example, NFVI 113 may represent multiple host devices such that units 123 and 124 may reside on different host devices. In one example, unit 123 and/or unit 124 may have functions that are distributed over a plurality of host devices. For instance, unit 123 and/or unit 124 may be instantiated and arranged (e.g., provisioned/programmed via computer-readable/computer-executable instructions, code, and/or programs) to provide for load balancing between two processors and several line cards that may reside on separate host devices.

In one example, network 105 may also include additional NFVI 111. For instance, unit 121 may be hosted on NFVI 111, which may comprise host devices having the same or similar physical components as NFVI 113. In addition, NFVI 111 may reside in a same location or in different locations from NFVI 113. As illustrated in FIG. 1, unit 121 may be configured to perform functions of an internal component of network 105. For instance, due to the connections available to NFVI 111, unit 121 may not function as a PE router, a SGW, a MME, a firewall, etc. Instead, unit 121 may be configured to provide functions of components that do not utilize direct connections to components external to network 105, such as a non-edge label switched router (LSR), or "intermediate node," a call control element (CCE), a media server, a domain name service (DNS) server, a gateway mobile switching center (GMSC), a short message service center (SMSC), etc.

In one example, NFVI 111 and unit 121, and NFVI 113 and units 123 and 124 may also be controlled and managed by a software defined network (SDN) controller 155. For instance, in one example, SDN controller 155 is responsible for such functions as provisioning and releasing instantiations of VNFs to perform the functions of routers, switches, and other devices, provisioning routing tables and other operating parameters for the VNFs, and so forth. In one example, SDN controller 155 may maintain communications with VNFs and/or host devices/NFVI via a number of control links which may comprise secure tunnels for signaling communications over an underling IP infrastructure of network 105. In other words, the control links may comprise virtual links multiplexed with transmission traffic and other data traversing network 105 and carried over a shared set of physical links. For ease of illustration the control links are omitted from FIG. 1. In one example, the SDN controller 155 may also comprise a virtual machine operating on NFVI/host device(s), or may comprise a dedicated device. For instance, SDN controller 155 may be collocated with one or more VNFs, or may be deployed in a different host device or at a different physical location.

Figure 4:
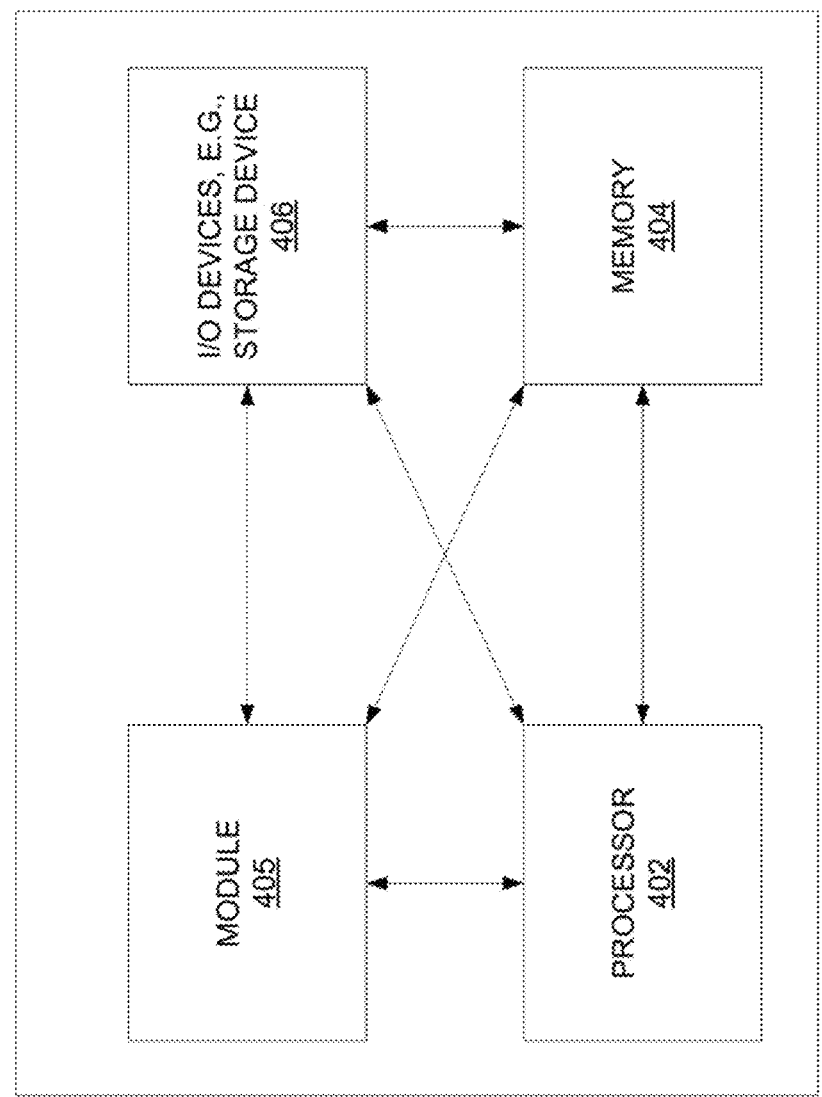
FIG. 4 illustrates an example high-level block diagram of a computer specifically programmed to perform the steps, functions, blocks, and/or operations described herein.

In one example, the SDN controller 155 may comprise a computing system or server, such as computing system 400 depicted in FIG. 4, and may be configured to provide one or more operations or functions in accordance with the present disclosure. For example, the functions of SDN controller 155 may include the selection of NFVI from among various NFVI available in network 105 (e.g., NFVI 111 or 113) to host various devices, such as routers, gateways, switches, etc., and the instantiation of such devices. For example, with respect to units 123 and 124, SDN controller 155 may download computer-executable/computer-readable instructions, code, and/or programs (broadly "provisioning code") for units 123 and 124 respectively, which when executed by a processor of the NFVI 113, may cause the NFVI 113 to perform as a label switched router (LSR), e.g., a label switched PE router, a gateway, a route reflector, a SGW, a MME, a firewall, a media server, a DNS server, a PGW, a GMSC, a SMSC, a CCE, and so forth. In one example, SDN controller 155 may download the provisioning code to the NFVI 113. In another example, SDN controller 155 may instruct the NFVI 113 to load the provisioning code previously stored on NFVI 113 and/or to retrieve the provisioning code from another device in network 105 that may store the provisioning code for one or more VNFs. The functions of SDN controller 155 may also include releasing or decommissioning unit 123 and/or unit 124 when no longer required, the transferring of the functions of units 123 and/or 124 to different NFVI, e.g., when NVFI 113 is taken offline, and so on.

As illustrated in FIG. 1, network 105 may also include internal nodes 131-135, which may comprise various components, such as routers, switches, route reflectors, etc., cellular core network, IMS network, and/or VoIP network components, and so forth. However, in accordance with the present disclosure it is assumed that internal nodes 131-135 comprise non-edge label switched routers (LSRs), e.g., intermediate nodes. In one example, these internal nodes 131-135 may also comprise VNFs hosted by and operating on additional NFVIs. For instance, as illustrated in FIG. 1, internal nodes 131 and 135 may comprise VNFs residing on additional NFVI (not shown) that are controlled by SDN controller 155 via additional control links. However, at least a portion of the internal nodes 131-135 may comprise dedicated devices or components, e.g., non-SDN reconfigurable devices.

Similarly, network 105 may also include components 181 and 182, e.g., label switched PE routers (or PE LSRs) interfacing with access network 160, and component 185, e.g., another PE LSR, which may interface with user device 142. For instance, in one example, network 105 may be configured such that user device 142 (e.g., a CE router) is dual-homed. In other words, user device 142 may access network 105 via either or both of unit 124 and component 185. As mentioned above, components 183 and 184 may comprise a serving gateway (SGW), a mobility management entity (MME), or the like. However, in another example, components 183 and 184 may also comprise PE routers (e.g., PE LSRs) interfacing with access networks 170, e.g., for non-cellular network-based communications. In one example, components 181-185 may also comprise VNFs hosted by and operating on additional NFVI. However, in another example, at least a portion of the components 181-185 may comprise dedicated devices or components.

For illustrative purposes, in one example, components 181-185 and unit 124 may comprise edge LSRs, while internal nodes 131-135, and unit 121 may be non-edge LSRs, or intermediate nodes, configured for MPLS routing within the network 105. In addition, in the present example, user devices 141-143 may comprise customer edge (CE) routers. Although some devices may comprise VNFs hosted on NFVI, other devices may comprise standalone or dedicated devices. However, for purposes of the present disclosure all of components 181-185, internal nodes 131-135, and units 121 and 124 may be configured as Path Computation Clients (PCCs) and may therefore communicate, e.g., via Path Computation Element Protocol (PCEP), to request tunnels (e.g., LSPs) from PCE(s), to receive responses with tunnels that are calculated, and so forth. As further illustrated in FIG. 1, the network 105 also includes a path computation element (PCE) 152, which may provide one or more functions for managing path utilizations for communication network tunnels. In one example, PCE 152 may include a topology information block (TIB) 153 that may include records for various paths between LSRs in network 105. A record may include, for example, a path identifier (ID), an identification of a start node and an end node, a capacity of the path, an ID of a tunnel to which the path is assigned, and a status of the path, and so forth. In one example TIB 153 may be part of and/or associated with PCE 152.

As illustrated in FIG. 1, network 105 may further include a network connectivity test (NCT) and/or soft failure detection (SFD) system 150. In one example, aspects of the present disclosure for identifying a router as a cause of a soft failure based upon a burst of network connectivity results indicating network connectivity test failures between edge router pairs in a communication network, e.g., as described in greater detail below in connection with the example method 300 of FIG. 3, may be performed by NCT/SFD system 150. In this regard, in one example, NCT/SFD system 150 may comprise all or a portion of a computing device or system, such as computing system 400, and/or processing system 402 as described in connection with FIG. 4 below, and may be configured to perform various operations in connection with examples of the present disclosure for identifying a router as a cause of a soft failure based upon a burst of network connectivity results indicating network connectivity test failures between edge router pairs in a communication network.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

To further illustrate, NCT/SFD system 150 may perform and/or manage network connectivity test between router pairs within and/or associated with network 105, e.g., edge router pairs. For instance, network connectivity tests may comprise transmission (and intended reception) of one or more packets across network 105. In accordance with the present disclosure, the network connectivity tests may be over defined paths, e.g., having defined hops/links and/or routers along such paths. To further illustrate, in one example, the network connectivity tests may utilize label switched paths (LSPs) or tunnels, e.g., using Multi-Protocol Label Switching (MPLS) or the like. For instance, the network connectivity tests may be over paths/tunnels identified by path/tunnel ID. For example, NCT/SFD system 150 may instruct various source routers in the network 105 (e.g., edge routers) to implement network connectivity tests to various destination routers over defined paths, e.g., by path/tunnel ID. For instance, NCT/SFD system 150 may instruct component 183 to perform a network connectivity test with component 182 as a destination router via a path/tunnel comprising links A, B, C, D, and E (e.g., which may be identified by a path/tunnel ID, such as "tunnel 1"). In one example, component 183 may then transmit one or more packets towards component 182, e.g., using one or more labels, e.g., in a label stack, to define an LSP tunnel of links A, B, C, D, and E and/or a path comprising component 183, internal nodes 131, 132, 133, and 135, and component 182.

In one example, the network connectivity test may comprise one or more probe packets. In one example, the network connectivity test may comprise a round trip test, such as a ping test, in which component 182 is expected to send one or more packets back to component 183, e.g., via a reverse path over the identical links/hops, e.g., links E, D, C, B, A and/or component 182, internal nodes 135, 133, 132, 131, and component 183. As such, component 183 may report a network connectivity test result of "success" or "failure" depending upon whether such return packet(s) is/are received from component 182, e.g., within a timeout time period, or the like. In another example, the network connectivity test may comprise a one-way test. For instance, in one example, NCT/SFD system 150 may communicate to component 182 to expect one or more network connectivity test packets from component 183. As such, component 182 may report a network connectivity test result of "success" or "failure" depending upon whether such packet(s) is/are received, e.g., within a timeout time period, or the like.

In one example, components of network 105 may alternatively or additionally implement network connectivity tests according to a schedule, e.g., periodically or otherwise, or based upon a sequence of instructions. For instance, component 183 may perform various network connectivity tests to various destinations. So as to not overwhelm component 183, component 183 may perform network connectivity tests to various destinations in a round-robin fashion and or in a weighted round-robin fashion such that network connectivity tests to a particular destination may occur with some probability, and where such probability may increase with increasing time since a last network connectivity tests to such destination was performed.

In one example, NCT/SFD system 150 may provide instructions and/or updates to components of network 105 (e.g., sources routers for network connectivity tests) as to the scheduling and/or algorithm for selecting whether and when to perform network connectivity tests. In one example, the source and/or destination of a network connectivity test may report the result to NCT/SFD system 150. In one example, the result may be transmitted to NCT/SFD system 150 upon completion, e.g., as soon as practicable. Alternatively, or in addition, in one example, a network connectivity test source and/or destination router may report network connectivity test results according to a schedule, e.g., periodically or otherwise, and/or when there is a reduced load on the router, in response to a request/poll from the NCT/SFD system 150, etc.

In a similar manner, network connectivity test results may be gathered by NCT/SFD system 150 from various routers engaged in performing network connectivity tests. For instance, NCT/SFD system 150 may gather and store network connectivity test results, e.g., locally at the NCT/SFD system 150 and/or in a data storage system attached to, integrated with, and/or accessible via one or more networks to NCT/SFD system 150. For example, each network connectivity test result may indicate the source and destination routers, a time of the network connectivity test (e.g., a timestamp or timestamps indicating time(s) when one or more test packets are sent), and a result (e.g., success or failure). In one example, the network connectivity test results may also include a path identifier (ID), or tunnel ID.

In one example, NCT/SFD system 150 may process the network connectivity test results to identify a sliding time window in which a number of network connectivity results indicating network connectivity test failures exceeds a threshold (e.g., a time period in which a soft error has potentially occurred). In one example, in response to the identification of such a soft error time period, NCT/SFD system 150 may then, within the identified time window, identify a burst of network connectivity results indicating network connectivity test failures between router pairs of network 105. In this regard, it should be noted that the burst may comprise a shorter time span within the time window that is identified.

In one example, the burst may be identified by applying a burst detection algorithm to the network connectivity results associated with the identified time window (e.g., having time stamps failing within the time window). For instance, as noted above, the burst detection algorithm may comprise a Kleinberg burst detection algorithm, or the like. In particular, the Kleinberg burst detection algorithm maybe used to identify periods of time in which a target event is unusually frequent, e.g., as defined by the algorithm and its parameters. It can be used to detect bursts in a continuous stream of events or in discrete batches of events. In addition, detected bursts may be used to identify trends and patterns in data, such as fads or bursts of activities. In one example, the sliding time window may be a fixed time period set by an operator of network 105, while a burst may be of flexible duration defined by the burst itself according to the burst detection algorithm definition. In one example, various parameters of the Kleinberg burst detection algorithm may be selected and/or tuned, such as s-factor or gamma. For instance, the s-factor may be the base of the exponent used to determine event frequency, e.g., in a given state, while gamma may be a coefficient that modifies the cost of a transition to a higher state. To further illustrate, gamma may relate to a density of data in that time period. For instance, the cost of a state change may be proportional to the increase in state number; where the proportion can be modified by adjusting gamma. Higher values for gamma may indicate that bursts must be sustained over longer periods of time in order for the algorithm to recognize an increased activity as a burst. Similarly, the value of the s-factor may be configurable, where higher values of "s" may demand a more dramatic increase of activity in order to be considered a burst. Another configurable parameter of the Kleinberg burst detection algorithm may be the offset, or time period, within which relevant events are considered (e.g., network connectivity test failures). For instance, as noted above, NCT/SFD system 150 may apply a sliding time window in which an initial screening for heightened activity (e.g., network connectivity failure events) is detected. In any case, NCT/SFD system 150 may thus identify a burst within the larger identified time window. More specifically, the NCT/SFD system 150 may identify the burst start and end times and/or burst duration as output(s) of the Kleinberg burst detection algorithm. In one example, the output(s) of the Kleinberg burst detection algorithm may further include a number of events occurring within the burst, and/or the particular events within the burst (e.g., the network connectivity test results that fall within the temporal bounds of the burst and that are thus considered part of the burst).

In one example, NCT/SFD system 150 may then select a subset of network connectivity test results indicating "failure" and which have timestamps within a time window associated with the burst. For instance, as noted above, in one example, the time window may be commensurate with the burst. In another example, such a time window may have a start time having a fixed time before an identified start of the burst and/or an end time having a fixed time after an identified end of the burst, e.g., one minute before the start of the burst to one minute after the end of the burst, five minutes before the start of the burst to five minutes after the end of the burst, etc. In still another example, such a time window may be based upon (1) the start and/or end time of the burst and (2) a duration of the burst, e.g., a time window centered on the burst and having a duration 5% percent longer than the burst, 10% longer than the burst, etc.

In one example, NCT/SFD system 150 may determine, for each network connectivity test result in the subset of network connectivity test results, connectivity path information, e.g., one or more routers between an edge router pair of the associated network connectivity test. For instance, the path information may be obtained from a topology information block 153, or the like, e.g., from PCE 152. From this information, NCT/SFD system 150 may then determine one or more routers with a highest number of occurrences in the path information for the subset of network connectivity test results. In addition, the router with the highest count (or one or more routers with the top "n" highest counts) may be identified as a cause (e.g., a root cause) of a soft failure/blackhole in the network 105.

In one example, the foregoing may include NCT/SFD system 150 generating a plurality of vectors, each vector associated with a network connectivity test result of the set of network connectivity test results. For instance, each vector may indicate routers along a network connectivity test path. In one example, the vectors may use one-hot encoding indicating whether a given router of network 105 is on the network connectivity path. In one example, the vectors may comprise rows in a table, e.g., each column associated with a respective router of the network 105. In such an example, the determining the router with a highest number of occurrences may include counting a number of entries in respective table columns of the table. In one example, NCT/SFD system 150 and/or the network 105 may apply at least one verification technique to confirm the router (or top "n" routers) as the cause of the soft failure in the communication network. For instance, NCT/SFD system 150 may perform and/or may instruct one or more other network components to perform a hop-by-hop label-switched path verification, e.g., along at least one path/tunnel including the identified root cause router(s).

In one example, NCT/SFD system 150 and/or the network 105 may implement one or more remedial actions in response to the identifying of the router with the highest count (or one or more routers with the top "n" highest counts) as the cause(s) of the soft failure in the network 105. In one example, this may be further in response to verification of the router(s) as being problematic using the secondary verification technique(s). For instance, this may include transmitting a notification, e.g., to another device, system, or other automated entities in network 105, to a customer device or system, e.g., CE router 142, 141 and/or 143, etc. For instance, NCT/SFD system 150 may transmit a notification to SDN controller 155 of the one or more routers identified as the root cause of a soft failure. In one example, the identified router(s) may comprise VNF(s). Accordingly, SDN controller 155 may disable the VNF(s), reset the VNF(s), instantiate one or more new VNFs to replace the identified VNF(s), apply new/updated configuration parameters for the VNF(s), and so forth. For instance, in one example, SDN controller 155 may cause a VNF router to flush IP routing tables and/or MPLS forwarding tables, and so forth. Similarly, where identified VNF(s) may comprise physical components, in one example, SDN controller 155 may instantiate one or more new VNFs on NFVI to replace the affected physical components, e.g., temporarily and/or more permanently. In one example, NCT/SFD system 150 may transmit instructions to reconfigure one or more aspects of network 105. For instance, NCT/SFD system 150 may transmit instructions to SDN controller 155 to implement one or more actions such as described above. Alternatively, or in addition, NCT/SFD system 150 may transmit instructions directly to one or more network elements, e.g., to reset, to flush routing tables and/or forwarding tables, etc. In one example, NCT/SFD system 150 and/or SDN controller 155 may notify and/or instruct PCE 152. For instance, PCE 152 may be notified of one or more routers that are a soft failure root cause. PCE 152 may then change router and/or link statuses affected by the router. In one example, PCE 152 may alter one or more paths/tunnels, e.g., to avoid links terminating on the identified root cause router(s). Alternatively, or in addition, a notification may warn one or more customers, e.g., one or more customer devices/systems, of a soft failure affecting one or more customer routes. For instance, a CE router may utilize a different tunnel that is assigned the customer, may use a different PE router, e.g., where the CE router is dual-homed, and so forth.

In one example, the one or more remedial actions may include presenting at least one visualization. For instance, NCT/SFD system 150 may generate a visualization to present, e.g., on a display screen endpoint device of one or more network personnel of network 105. For example, the visualization may include a geographic map identifying a location of the root cause router(s), may include a network topology map indicating the root cause router(s) in the context of the various links to other routers or other network components, etc. In one example, additional visual indicators such as coloring, shading, highlighting, varying intensity, or the like may be utilized to indicate a severity of a soft failure. For instance, the more customer routes affect and/or a greater volume of customer traffic affected may result in a higher severity indicator. In another example, a visualization may include a chart illustrating a number of network connectivity test failures per time unit within the burst (e.g., five second intervals within a one minute burst, or the like) and/or a total number network connectivity tests occurring in each time interval between the start and end of the burst, etc. In one example, the at least one visualization may be presented via a graphical user interface that may permit selection of different types of visualization, and which may further provide for the display of additional information, e.g., by presenting additional window(s) with information on a data center in which a root cause router is located, contacts for available network personnel to address the affected router and/or NFVI hardware, and so forth. In one example, additional information presented may include a history of soft failures for the identified root cause routers. For instance, this may include the dates and/or times, as well as any further information on the root cause. For instance, network personnel and/or other automated systems may further determine specific causality within the router for past soft failures, such as a misconfigured MPLS forwarding table, or the like.

It should be noted that the system 100 has been simplified. In other words, the system 100 may be implemented in a different form than that illustrated in FIG. 1. For example, the system 100 may be expanded to include additional networks, such as NOC networks, and additional network elements (not shown) such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions and/or combine elements that are illustrated as separate devices. For example, NCT/SFD system 150, SDN controller 155, PCE 152, and/or other network elements may comprise functions that are spread across several devices that operate collectively as an NCT/SFD system, an SDN controller, a PCE, etc. In another example, PCE 152 and SDN controller 155 may be integrated into a single system, NCT/SFD system 150 and SDN controller 115 may be integrated into a single system, etc. Thus, these and other modifications of the system 100 are all contemplated within the scope of the present disclosure.

Figure 2:
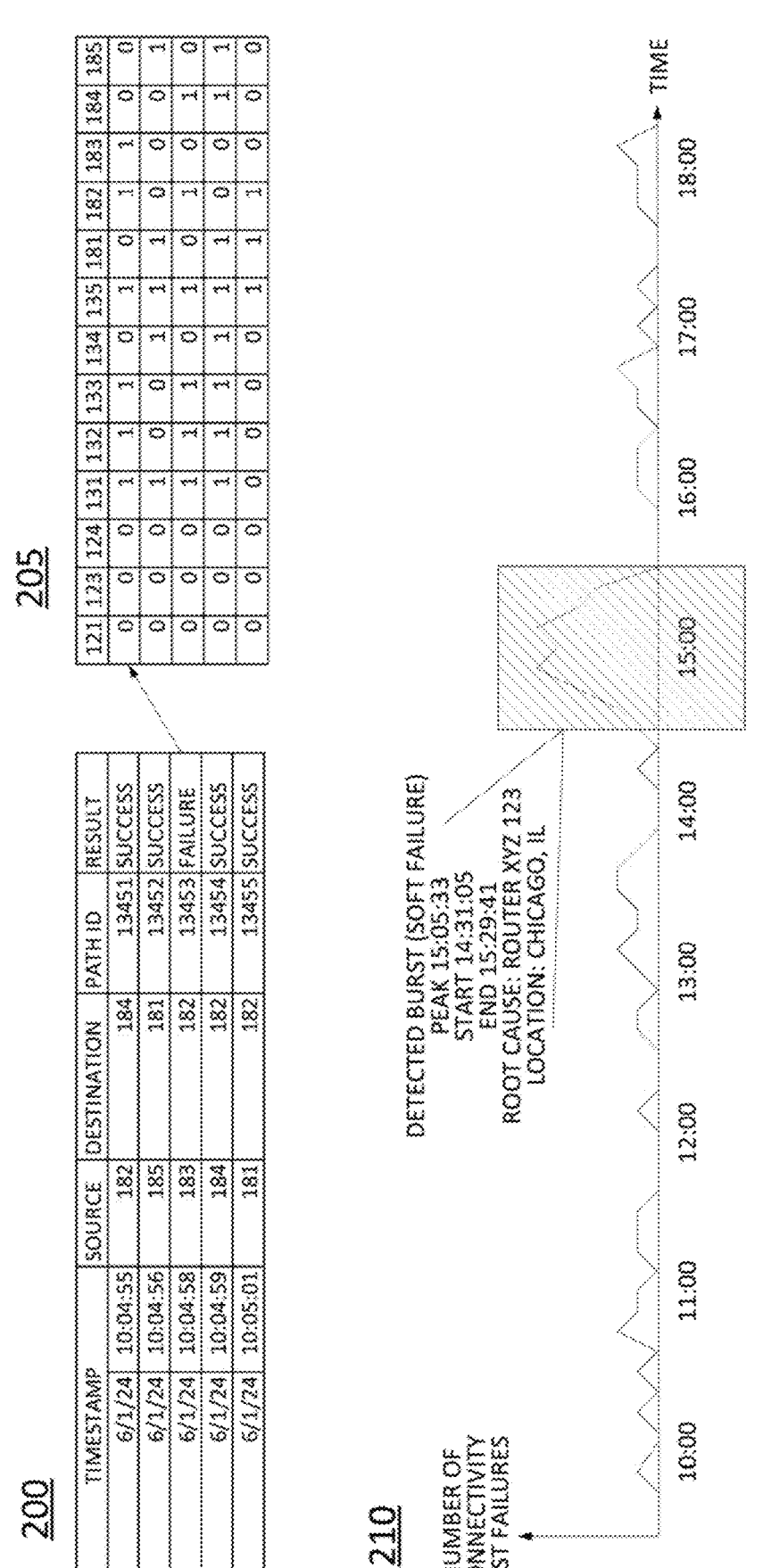
FIG. 2 illustrates an example set of network connectivity test results, an example one-hot encoding path table, and an example visualization according to the present disclosure.

To further aid in understanding the present disclosure, FIG. 2 illustrates an example set of network connectivity test results 200. For example, as discussed above, each network connectivity test result may include a timestamp and may further indicate a source, a destination, and a result (e.g., success or failure). In one example, and as illustrated in the example set of network connectivity test results 200, each network connectivity test result may further include a path identifier (ID) (or tunnel ID). For instance, the path ID may be used as a look-up for path information, e.g., in a tunnel information block (TIB) or the like, indicating the routers on a particular path. In one example, the example set of network connectivity test results 200 may be associated with network connectivity tests for paths in network 105 of FIG. 1. For instance, a first network connectivity test (e.g., the first row in the example set of network connectivity test results 200) may be for a network connectivity test between component 182 and component 184 of the network 105.

FIG. 2 also illustrates an example one-hot encoding path table 205, which may include vectors (e.g., rows) for each network connectivity test result indicating a failure and having a timestamp within a time window associated with a detected burst. For example, the network connectivity test result in the third row of the example set of network connectivity test results 200 indicates a failure of the test, and may correspond to the vector in the first row of one-hot encoding path table 205. For instance, this may be the first network connectivity test result indicating a failure following the start time of the time window associated with a detected burst. To further illustrate, each vector may indicate whether a given router of the network is along a path of associated network connectivity test. For example, in the first vector/row, there may be a one (1) for each network component (e.g., each router) on the path, and a zero (0) for each network component not on the path. In this regard, it is again noted that the path for this network connectivity test result may comprise component 183, internal nodes 131, 132, 133, and 135, and component 182 (and/or links A, B, C, D, and E). In one example, to identify the root cause (e.g., a router most likely to be the cause of a soft failure), the column entries from one-hot encoding path table 205 may be summed, and the column with the highest sum may be considered the root cause (e.g., the most likely to be the cause of a soft failure). In this case, internal node 135 may therefore be the root cause. It should be noted that in other examples, one or more network components, e.g., routers, may be identified as the root cause. For instance, the top two routers by count from one-hot encoding path table 205, the top three routers, etc. For example, internal node 131 may also be reported as a root cause (e.g., a likely root cause, or second most likely root cause). Thus, these and other modifications are all contemplated within the scope of the present disclosure.

FIG. 2 further illustrates an example visualization comprising a graph 210 illustrating a number of connectivity test failures per time interval along with an indicator of a detected burst (e.g., a detected soft failure). For example, the indicator may comprise shading, highlighting, or the like, which may visually indicate when the burst begins and ends. In addition, the example visualization may also present one or more informational items about the burst, such as the peak time, the start time, the end time, the root cause, the location of the root cause (e.g., a geographic location of the router(s)), etc. It should be noted that the example of FIG. 2 illustrates certain informational items presented in a particular way. However, other, further, and different examples may present the same information in a different form, or may present less information, different information, and/or additional information, such as equipment information of the root cause router, such as a manufacturer, a version number, a software version, etc., a list of nearby network personnel who may be available to troubleshoot, an address of a data center in which the physical hardware is located, a service history of the router(s), and so forth. In one example, the graph 210 may be presented via a graphical user interface that may permit selection of different types of visualizations, selection of different types of information for display, and so on. Thus, these and other modifications are all contemplated within the scope of the present disclosure.

FIG. 3 illustrates a flowchart of an example method 300 for identifying a router as a cause of a soft failure based upon a burst of network connectivity results indicating network connectivity test failures between edge router pairs in a communication network. In one example, steps, functions and/or operations of the method 300 may be performed by a network-based device, such as NCT/SFD system 150 in FIG. 1, or NCT/SFD system 150 in conjunction with other components of the system 100, such as PCE 152 and/or SDN controller 155, components 181-184, etc. In one example, the steps, functions, or operations of method 300 may be performed by a computing device or system 400, and/or a processing system 402 as described in connection with FIG. 4 below. For instance, the computing device 400 may represent at least a portion of NCT/SFD system 150 in accordance with the present disclosure. For illustrative purposes, the method 300 is described in greater detail below in connection with an example performed by a processing system, such as processing system 402. The method 300 begins in step 305 and may proceed to optional step 310 or step 315.

At optional step 310, the processing system may transmit instructions to a plurality of source routers in the communication network to initiate a plurality of network connectivity tests. It should be noted that although examples of the present disclosure primarily describe network connectivity test between provider edge routers (e.g., PE LSRs), in other, further, and different examples, source and destination routers may alternatively or additionally include a non-edge label switched router (LSR), or "intermediate nodes," CE routers, and so on.

At step 315, the processing system obtains a set of network connectivity test results, each network connectivity test result indicating a network connectivity test success or a network connectivity test failure of a network connectivity test between a respective router pair from among a plurality of routers of a communication network. For each network connectivity result, the network connectivity test may comprise a transmission of at least one probe packet. In one example, the network connectivity test may be a round-trip test, such as a ping, or the like. However, in another example, the network connectivity test may be a one-way test. For instance, a destination router for the test may report receipt of the at least one probe packet to the source router and/or the processing system (e.g., a successful network connectivity test). Conversely, a failure to receive a report may indicate a network connectivity test failure. In one example, for each network connectivity result, the network connectivity test may comprise a transmission of at least one MPLS packet, e.g., a packet having a stack of labels that may be used for label-switched routing through the communication network.

At optional step 320, the processing system may identify at least one time period in which a number of network connectivity results indicating network connectivity test failures exceeds a threshold (e.g., a time period in which a soft error has potentially occurred). The time period may be a sliding time window for detection and in which the threshold is exceeded. The sliding time window duration and/or the threshold may be set by a network operator, for instance.

At step 325, the processing system identifies, from the set of network connectivity test results, a burst of network connectivity results indicating network connectivity test failures between router pairs in the communication network. For instance, in one example, step 325 may include applying a burst detection algorithm implemented by the processing system, e.g., a Kleinberg burst detection algorithm. In one example, the burst may comprise a shorter time period within the at least one time period that may be identified at optional step 320. For instance, the Kleinberg burst detection algorithm may be applied to network connectivity test results within the at least one time period, or another time period associated with the at least one time period, e.g., starting before the beginning of the at least one time period and/or ending after the end of the at least one time period, such as five minutes before or after the at least one time period, two minutes before or after the at least one time period, etc. To further illustrate, in one example, the time period may be a fixed time period set by an operator, while the burst may be a flexible duration defined by the burst itself according to the burst detection algorithm.

At step 330, the processing system identifies, from the set of network connectivity results, a subset of network connectivity test results indicating network connectivity test failures from within a time period associated with the burst. For instance, the time period, or time window, may be commensurate with the burst. In another example, such a time window may have a start time having a fixed time before an identified start of the burst and/or an end time having a fixed time after an identified end of the burst, e.g., one minute before the start of the burst to one minute after the end of the burst, five minutes before the start of the burst to five minutes after the end of the burst, etc. In still another example, such a time window may be based upon (1) the start and/or end time of the burst and (2) a duration of the burst, e.g., a time window centered on the burst and having a duration 5% percent longer than the burst, 10% longer than the burst, etc.

At step 335, the processing system determines, for each network connectivity test result in the subset of network connectivity test results, connectivity path information comprising one or more routers between a router pair of the network connectivity test result. In one example, the connectivity path information may comprise a known network path. For instance, as noted above, in one example, for each network connectivity result, the network connectivity test may comprise a transmission of at least one MPLS packet. In such case, the connectivity path information may be obtained according to a known path/tunnel ID (e.g., where the probe packets may be transmitted with a corresponding MPLS stack to traverse the correct hops/routers along the path/tunnel via label switched routing). In one example, probe packets may all utilize a same forwarding equivalence class (FEC), e.g., a management FEC, such that in the absence of a network connectivity failure, the probe packets are consistently processed throughout the communication network.

At step 340, the processing system determines, from among the connectivity path information of the subset of network connectivity test results, a router with a highest number of occurrences. For instance, step 340 may include generating a plurality of vectors, where each vector may be associated with a network connectivity test result of the set of network connectivity test results, and where each vector may indicate routers along a network connectivity test path. In one example, each vector may be generated via a one-hot encoding indicating whether a given router of the communication network is on the network connectivity path. In one example, the plurality of vectors may comprise a plurality of rows of a table, or may be added as rows to a table. In one example, step 340 may include counting a number of entries in respective table columns of the table, where each table column may be associated with a respective router of the communication network. For instance, such a table may be the same as or similar to the example one-hot encoding path table 205 of FIG. 2.

At optional step 345, the processing system may apply at least one verification technique to confirm the router with the highest number of occurrences as the cause of the soft failure in the communication network. For instance, optional step 345 may include performing at least one hop-by-hop label-switched path verification. For example, the processing system may select one or more paths that include the router with the highest number of occurrences and may perform connectivity tests from a source router to intermediate routers between the source router and the router with the highest number of occurrences along the path, e.g., a sequence of tests in the order of the routers along the path. Alternatively, or in addition, the processing system may initiate connectivity tests from a source router to one or more intermediate routers between the router with the highest number of occurrences and a destination router along a selected path. It is expected that one or more connectivity tests should succeed between the source router and the intermediate routers preceding the router with the highest number of occurrences on a selected path, while one or more connectivity tests should fail between the source router and one or more intermediate routers between the router with the highest number of occurrences and the destination router on the path.

At step 350, the processing system identifies the router with the highest number of occurrences as the cause of the soft failure in the communication network. For instance, this router may be considered as the root cause of a soft failure, e.g., when there is no "hard" error with an explicit alarm or notification of a problem with the router, and where the router is identified via the present method at step 340. In one example, the router with the highest number of occurrences may be identified as the cause of the soft failure when it has the highest number of occurrences and is further verified at optional step 345.

At optional step 355, the processing system may perform at least one remedial action in the communication network in response to the identifying of the router as the cause of the soft failure in the communication network. For example, optional step 355 may include transmitting at least one notification. For instance, as described above, the processing system may transmit a notification to another device, system, or other automated entities in network, to a customer device or system, etc. In one example, the notification may comprise information about the identified router and/or the soft error. In one example, the notification may comprise instructions, e.g., to configure/reconfigure at least one aspect of the communication network. Alternatively, or in addition, optional step 355 may include presenting at least one visualization. For instance, the processing system may generate a visualization to present, e.g., on a display screen endpoint device of one or more network personnel, on one or more customer devices (e.g., customers having routes affected by the soft failure), etc. For example, the visualization may include a geographic map identifying a location of the root cause router(s), may include a network topology map indicating the root cause router(s) in the context of the various links to other routers or other network components, etc. In one example, additional visual indicators such as coloring, shading, highlighting, varying intensity, or the like may be utilized to indicate a severity of a soft failure.

Following step 350 or optional step 355, the method 300 proceeds to step 395. At step 395, the method 300 ends.

It should be noted that the method 300 may be expanded to include additional steps or may be modified to include additional operations with respect to the steps outlined above. For instance, in one example the processor may repeat the steps of the method 300 by collecting additional network connectivity test results, identifying one or more additional bursts, performing additional remedial actions, etc. In one example, the method 300 may further include tuning one or more parameters of the burst detection algorithm, such as gamma and/or s-factor, tuning the time window of optional step 320, and so forth. In one example, step 340 and/or step 350 may include identifying one or more routers with the top "n" highest counts as a cause (e.g., a root cause) of a soft failure/blackhole in the network. In one example, the method 300 may be expanded or modified to include steps, functions, and/or operations, or other features described above in connection with the example(s) of FIG. 1 and/or FIG. 2, or as described elsewhere herein. Thus, these and other modifications are all contemplated within the scope of the present disclosure.

In addition, although not specifically specified, one or more steps, functions or operations of the method 300 may include a storing, displaying and/or outputting step as required for a particular application. In other words, any data, records, fields, and/or intermediate results discussed in the example method 300 can be stored, displayed and/or outputted to another device as required for a particular application. Furthermore, steps or blocks in FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 300 may comprise optional steps, or can be combined, separated, and/or performed in a different order from that described above, without departing from the example embodiments of the present disclosure.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for identifying a router as a cause of a soft failure based upon a burst of network connectivity results indicating network connectivity test failures between edge router pairs in a communication network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 406 may also include antenna elements, antenna arrays, remote radio heads (RRHs), baseband units (BBUs), transceivers, power units, and so forth. Although only one processor element is shown, it should be noted that the computing device may employ a plurality of processor elements. Furthermore, although only one computing device is shown in the figure, if the method(s) as discussed above is/are implemented in a distributed or parallel manner for a particular illustrative example, i.e., the steps of the above method(s) is/are implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method(s). In one example, instructions and data for the present module or process 405 for identifying a router as a cause of a soft failure based upon a burst of network connectivity results indicating network connectivity test failures between edge router pairs in a communication network (e.g., a software program comprising computer-executable instructions) can be loaded into memory 404 and executed by hardware processor element 402 to implement the steps, functions, or operations as discussed above in connection with the illustrative method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for identifying a router as a cause of a soft failure based upon a burst of network connectivity results indicating network connectivity test failures between edge router pairs in a communication network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
transmitting, by a processing system including at least one processor deployed in a communication network, instructions to a plurality of source routers in the communication network to initiate a plurality of network connectivity tests, wherein each of the plurality of network connectivity tests comprises a transmission of at least one packet via the communication network;
obtaining, by the processing system via the communication network, a set of network connectivity test results, each network connectivity test result indicating a network connectivity test success or a network connectivity test failure of a network connectivity test of the plurality of network connectivity tests between a respective router pair from a plurality of routers of the communication network, wherein the plurality of routers includes the plurality of source routers;
identifying, by the processing system from the set of network connectivity test results, a burst of network connectivity results indicating network connectivity test failures between router pairs in the communication network;
identifying, by the processing system from the set of network connectivity results, a subset of network connectivity test results indicating network connectivity test failures from within a time period associated with the burst;
determining, by the processing system for each network connectivity test result in the subset of network connectivity test results, connectivity path information comprising one or more routers between a router pair of each network connectivity test result;
determining, by the processing system from the connectivity path information of the subset of network connectivity test results, a router with a highest number of occurrences; and
identifying, by the processing system, the router as a cause of a soft failure in the communication network.

2. The method of claim 1, wherein the identifying of the burst of network connectivity results indicating the network connectivity test failures comprises applying a burst detection algorithm implemented by the processing system.

3. The method of claim 2, wherein the burst detection algorithm comprises a Kleinberg burst detection algorithm.

4. The method of claim 2, further comprising:
identifying at least one time period in which a number of network connectivity results indicating the network connectivity test failures exceeds a threshold.

5. The method of claim 4, wherein the burst comprises a shorter time period within the at least one time period.

6. The method of claim 1, wherein the at least one packet comprises at least one probe packet.

7. The method of claim 1, wherein the at least one packet comprises at least one multi-protocol label switching packet.

8. The method of claim 7, wherein the connectivity path information for the network connectivity test for each network connectivity test result in the subset comprises a known network path.

9. The method of claim 8, wherein the known network path is identified by a path identifier.

10. The method of claim 1, wherein the determining the router with the highest number of occurrences comprises generating a plurality of vectors, each vector associated with a network connectivity test result of the set of network connectivity test results, and each vector indicating routers along a network connectivity test path.

11. The method of claim 10, wherein the each vector is generated via a one-hot encoding indicating whether a given router of the communication network is on the network connectivity test path.

12. The method of claim 11, wherein the plurality of vectors comprises a plurality of rows of a table, wherein the determining the router with the highest number of occurrences comprises counting a number of entries in respective table columns of the table, and wherein each table column is associated with a respective router of the communication network.

13. The method of claim 1, further comprising:
applying at least one verification technique to confirm the router as the cause of the soft failure in the communication network.

14. The method of claim 13, wherein the applying the at least one verification technique comprises performing at least one hop-by-hop label-switched path verification.

15. The method of claim 1, further comprising:
performing at least one remedial action in the communication network in response to the identifying of the router as the cause of the soft failure in the communication network.

16. The method of claim 15, wherein the at least one remedial action comprises at least one of:

transmitting at least one notification; or presenting at least one visualization.

17. The method of claim 15, wherein the at least one remedial action comprises:

reconfiguring at least one aspect of the communication network.

18. A non-transitory computer-readable medium storing instructions which, when executed by a processing system including processor deployed in a communication network, cause the processing system to perform operations, the operations comprising:

transmitting first instructions to a plurality of source routers in the communication network to initiate a plurality of network connectivity tests, wherein each of the plurality of network connectivity tests comprises a transmission of at least one packet via the communication network;

obtaining, via the communication network, a set of network connectivity test results, each network connectivity test result indicating a network connectivity test success or a network connectivity test failure of a network connectivity test of the plurality of network connectivity tests between a respective router pair from a plurality of routers of the communication network, wherein the plurality of routers includes the plurality of source routers;

identifying, from the set of network connectivity test results, a burst of network connectivity results indicating network connectivity test failures between router pairs in the communication network;

identifying, from the set of network connectivity results, a subset of network connectivity test results indicating network connectivity test failures from within a time period associated with the burst;

determining, for each network connectivity test result in the subset of network connectivity test results, connectivity path information comprising one or more routers between a router pair of the network connectivity test result;

determining, from the connectivity path information of the subset of network connectivity test results, a router with a highest number of occurrences; and identifying the router as a cause of a soft failure in the communication network.

19. An apparatus comprising:

a processing system including at least one processor; and a computer-readable medium storing instructions which, when executed by the processing system when deployed in a communication network, cause the processing system to perform operations, the operations comprising:

transmitting first instructions to a plurality of source routers in the communication network to initiate a plurality of network connectivity tests, wherein each of the plurality of network connectivity tests comprises a transmission of at least one packet via the communication network;

obtaining, via the communication network, a set of network connectivity test results, each network connectivity test result indicating a network connectivity test success or a network connectivity test failure of a network connectivity test of the plurality of network connectivity tests between a respective router pair from a plurality of routers of the communication network, wherein the plurality of routers includes the plurality of source routers;

identifying, from the set of network connectivity test results, a burst of network connectivity results indicating network connectivity test failures between router pairs in the communication network;

identifying, from the set of network connectivity results, a subset of network connectivity test results indicating network connectivity test failures from within a time period associated with the burst;

determining, for each network connectivity test result in the subset of network connectivity test results, connectivity path information comprising one or more routers between a router pair of the network connectivity test result;

determining, from the connectivity path information of the subset of network connectivity test results, a router with a highest number of occurrences; and identifying the router as a cause of a soft failure in the communication network.

20. The apparatus of claim 19, wherein the identifying of the burst of network connectivity results indicating the network connectivity test failures comprises applying a burst detection algorithm implemented by the processing system.

* * * * *